(12) United States Patent
Cook

(10) Patent No.: US 7,703,932 B2
(45) Date of Patent: Apr. 27, 2010

(54) ALL-REFLECTIVE, WIDE-FIELD-OF-VIEW, INVERSE-TELEPHOTO OPTICAL SYSTEM WITH EXTERNAL POSTERIOR APERTURE STOP AND LONG BACK FOCAL LENGTH

(75) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 319 days.

(21) Appl. No.: 11/796,637

(22) Filed: Apr. 27, 2007

(65) Prior Publication Data
US 2008/0266687 A1   Oct. 30, 2008

(51) Int. Cl.
*G02B 5/10* (2006.01)
(52) U.S. Cl. ........................ 359/858; 356/326
(58) Field of Classification Search ......... 359/355–357, 359/727, 729, 731, 732, 856–859, 850; 356/326–334
See application file for complete search history.

(56) References Cited

U.S. PATENT DOCUMENTS

| | | | |
|---|---|---|---|
| 4,101,195 A | 7/1978 | Korsch et al. | |
| 4,265,510 A | 5/1981 | Cook | |
| 4,598,981 A | 7/1986 | Hallam et al. | |
| 4,691,999 A | 9/1987 | Wheeler | |
| 5,120,971 A | 6/1992 | Matsumura et al. | |
| 5,260,767 A | 11/1993 | Cook | |
| 5,331,470 A * | 7/1994 | Cook | 359/859 |
| 5,446,581 A | 8/1995 | Jamieson | |
| 5,477,395 A | 12/1995 | Cook | |
| 5,550,672 A * | 8/1996 | Cook | 359/365 |
| 5,847,879 A | 12/1998 | Cook | |
| 6,587,136 B2 | 7/2003 | Hayashi | |
| 6,886,953 B2 | 5/2005 | Cook | |
| 2003/0179443 A1 | 9/2003 | Cook | |

OTHER PUBLICATIONS

Irving R. Abel et al., "The pursuit of symmetry in wide-angle reflective optical designs", *Proc. of technical papers presented at the International Lens Design Conference, May 31, 1980-Jun. 4, 1980, Mills College, Oakland, California*, SPIE vol. 237, pp. 271-280.

* cited by examiner

*Primary Examiner*—Alessandro Amari
(74) *Attorney, Agent, or Firm*—Pillsbury Winthrop Shaw Pittman LLP

(57) ABSTRACT

An imaging optical system includes a set of mirrors including at least three mirrors on a beam path. Only a last mirror on the beam path has a positive optical power and all other mirrors have negative optical power. The sum of the optical powers of the mirrors is zero. An external posterior aperture stop is on the beam path between the last mirror and the image plane. A back focal length of the optical system is equal to or greater than an effective focal length of the optical system. The field of view is large, and typically at least 30-40 degrees in one plane.

20 Claims, 6 Drawing Sheets

| SURF NO. | DESCRIPTION | RADIUS | THICKNESS | MATERIAL | CC | R**4 |
|---|---|---|---|---|---|---|
| 1 | PRIMARY | 11.6925 | -1.9180 | REFL | | 2.13497E-03 |
| 2 | SECONDARY | -4.9579 | 2.0124 | REFL | | -9.83014E-03 |
| 3 | TERTIARY | -3.4019 | -2.0116 | REFL | 0.660158 | 1.41946E-03 |
| 4 | STOP | INF. | 1.0106 | AIR | | |
| 5 | FOCAL PLANE | INF. | | | | |

STOP DIAMETER IS 0.164
FOV OFFSET IS 18.2335 DEG.
FOCAL LENGTH IS 1.000
ENTRANCE PUPIL DIAMETER IS 0.177
OPTICAL SPEED IS F/5.65
FOV IS 11.4 X 45 DEG.

| SURF NO. | R6 | R8 | R**10 | DECENTER |
|---|---|---|---|---|
| 1 | -8.87888E-05 | 1.94365E-04 | -1.07715E-04 | |
| 2 | -2.26004E-03 | 4.10806E-04 | 5.57198E-04 | |
| 3 | 2.10779E-04 | -6.10341E-05 | 7.99062E-05 | |
| 4 | | | | 0.34169 |
| 5 | | | | 0.3332 |

FIG. 5

| SURF NO. | DESCRIPTION | RADIUS | THICKNESS | MATERIAL | CC | R**4 |
|---|---|---|---|---|---|---|
| 1 | PRIMARY | 12.9114 | -0.8935 | REFL | | -1.75123E-02 |
| 2 | SECONDARY | -8.2862 | 1.2062 | REFL | | -5.34830E-02 |
| 3 | TERTIARY | 7.0227 | -1.4148 | REFL | | -1.37498E-02 |
| 4 | QUATERNARY | 3.0648 | 1.4008 | REFL | 0.472109 | -2.15650E-03 |
| 5 | STOP | INF | 1.4949 | AIR | | |
| 6 | FOCAL PLANE | INF | | | | |

STOP DIAMETER IS 0.243
FOV OFFSET IS 22.415 DEG.
FOCAL LENGTH IS 1.000
ENTRANCE PUPIL DIAMETER IS 0.167
OPTICAL SPEED IS F/6.0
FOV IS 8.2 x 4.5 DEG.

| SURF NO. | R6 | R8 | R**10 | | DECENTER |
|---|---|---|---|---|---|
| 1 | 2.60304E-03 | -2.71442E-04 | 1.57925E-05 | | |
| 2 | -1.32922E-02 | -2.10040E-03 | -7.61484E-03 | | |
| 3 | 1.62173E-03 | -8.43781E-05 | 1.21077E-03 | | |
| 4 | -3.13285E-04 | 1.39481E-05 | -6.36171E-05 | | |
| 5 | | | | | 0.31546 |
| 6 | | | | | 0.39267 |

FIG. 8

ALL-REFLECTIVE, WIDE-FIELD-OF-VIEW, INVERSE-TELEPHOTO OPTICAL SYSTEM WITH EXTERNAL POSTERIOR APERTURE STOP AND LONG BACK FOCAL LENGTH

This invention relates to an all-reflective optical system and, more particularly, to such an optical system having a wide-field-of-view, an external posterior aperture stop, and a long back focal length.

BACKGROUND OF THE INVENTION

Optical devices having "back-end" components such as infrared imaging systems or double-pass spectrometers typically use "front-end" optics, or "foreoptics", to image the scene to the back-end components. The foreoptics have distinct requirements associated with the back-end components. The meeting of these requirements of the foreoptics either makes possible or facilitates the operation of the back-end components.

One of the most important requirements for scanning surveillance systems such as aircraft-mounted or spacecraft-mounted sensors is a wide field of view. For certain applications, the foreoptics must have a full-angle field of view, in at least one direction, of at least 30 degrees, and preferably of at least 40 degrees. It is desirable that the foreoptics have a long back focal length in order to permit the back-end components to be positioned in a container, such as a dewar, while the foreoptics is positioned outside the container and optically communicates with the back-end components through a window in the wall of the container. It is also strongly preferred in such applications that the foreoptics have an external posterior aperture stop. That is, it is preferred that the foreoptics have an aperture stop that is positioned along the beam path between the final optical element of the foreoptics and the image plane. In infrared applications, for example, the external posterior aperture stop may be placed within the interior of the dewar at one of the cold-shields of the dewar, with the front-end optical elements placed outside of the dewar. Finally, in many applications it is desirable that the propagation of light through the foreoptics not be dependent upon the wavelength of the light, because it may be important to image different wavelength bands.

There are no optical systems that are suitable as foreoptics and meet the various requirements discussed above. Accordingly, there is a need for such an optical system. The present invention fulfills this need, and further provides related advantages.

SUMMARY OF THE INVENTION

The present invention provides an all-reflective imaging optical form, which has a full-angle field of view of more than 30 degrees. The image surface is planar. The back focal length is equal to, or greater than, the effective focal length, and there is an external posterior aperture stop. This optical system is therefore highly suitable as the foreoptics for applications such as dewar-enclosed detectors and double-pass spectrometers.

In accordance with the invention, an imaging optical system has a beam path and an image plane. The optical system comprises a set of mirrors including at least three mirrors on the beam path. Only a last mirror on the beam path has a positive optical power and all other mirrors have negative optical power. The sum of the optical powers of the mirrors is zero. The full-angle field of view of the set of mirrors is typically at least 30 degrees in one direction, and more preferably at least 40 degrees in one direction. There is an external posterior aperture stop on the beam path between the last mirror and the image plane. Preferably, a back focal length of the optical system is equal to or greater than an effective focal length of the optical system.

In one embodiment, the set of mirrors comprises exactly three optically powered mirrors. In this embodiment, the set of mirrors have optical powers of negative, negative, and positive in order along the beam path. That is, the mirror having positive optical power is closest to the external posterior aperture stop and to the image plane (as compared with the mirrors having negative optical power), measured along the beam path. In another embodiment, the set of mirrors comprises exactly four optically powered mirrors. In this embodiment, the set of mirrors have optical powers of negative, negative, negative, and positive along the beam path. The mirror having positive optical power is closest to the external posterior aperture stop and to the image plane (as compared with the mirrors having negative optical power), measured along the beam path.

The optical system is typically found in combination with other optical components to form useful optical devices. For example, there may be a window between the last mirror on the beam path (the mirror of positive optical power) and the external posterior aperture stop. One application has a dewar with a window between the last mirror on the beam path and the external posterior aperture stop, and the external posterior aperture stop is within the dewar, preferably at a cold shield within the dewar so that the external posterior aperture stop is a cooled stop. In such a structure, there is usually a detector on the beam path within the dewar at the image plane, such that the external posterior aperture stop is between the window and the detector.

In another application, the optical system further includes a double-pass spectrometer. The set of mirrors comprises a foreoptics for the double-pass spectrometer.

In a preferred embodiment, an imaging optical system having a beam path and an image plane comprises a set of mirrors comprising exactly three optically powered mirrors or exactly four optically powered mirrors on the beam path. Only a last mirror of the set on the beam path has a positive optical power, and all other mirrors of the set have negative optical power. The sum of the optical powers of the mirrors is zero. The optical system has an external posterior aperture stop between the last mirror and the image plane. A back focal length of the optical system is equal to or greater than an effective focal length of the optical system. Other compatible features discussed herein may be used with this embodiment.

Other potential types of foreoptics do not meet all of these requirements. For example, wide angle large reflective unobscured systems (WALRUS)-type optical systems do not have an external posterior aperture stop and have a short back focal length. Schwarzschild optics do not have a planar image surface, and variations of Schwarzschild optics having a planar image surface do not have an external posterior aperture stop.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 5 is an optical prescription for a typical three-mirror imaging optical system of the type shown in FIGS. 3-4;

FIG. 8 is an optical prescription for a typical four-mirror imaging optical system of the type shown in FIGS. 6-7.

DETAILED DESCRIPTION OF THE INVENTION

Figure 1:
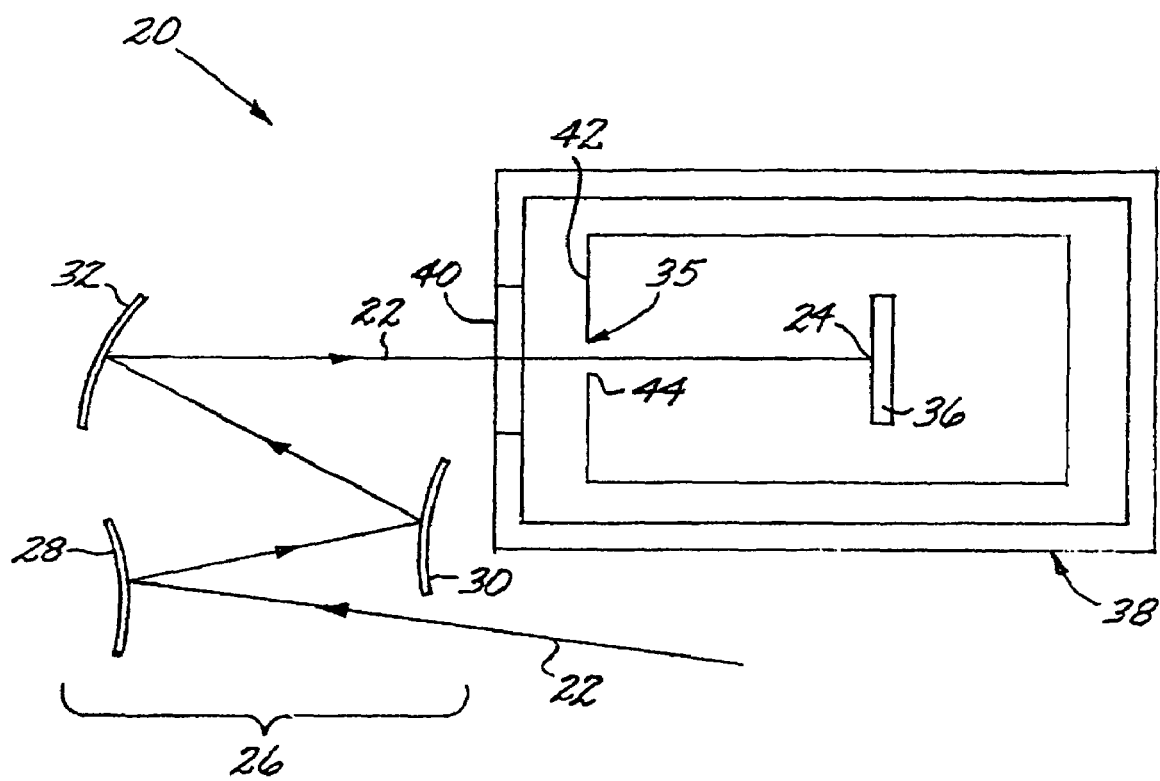
FIG. 1 is a schematic ray path drawing of an optical system using a three-mirror set, in conjunction with a detector in a dewar.
Figure 2:
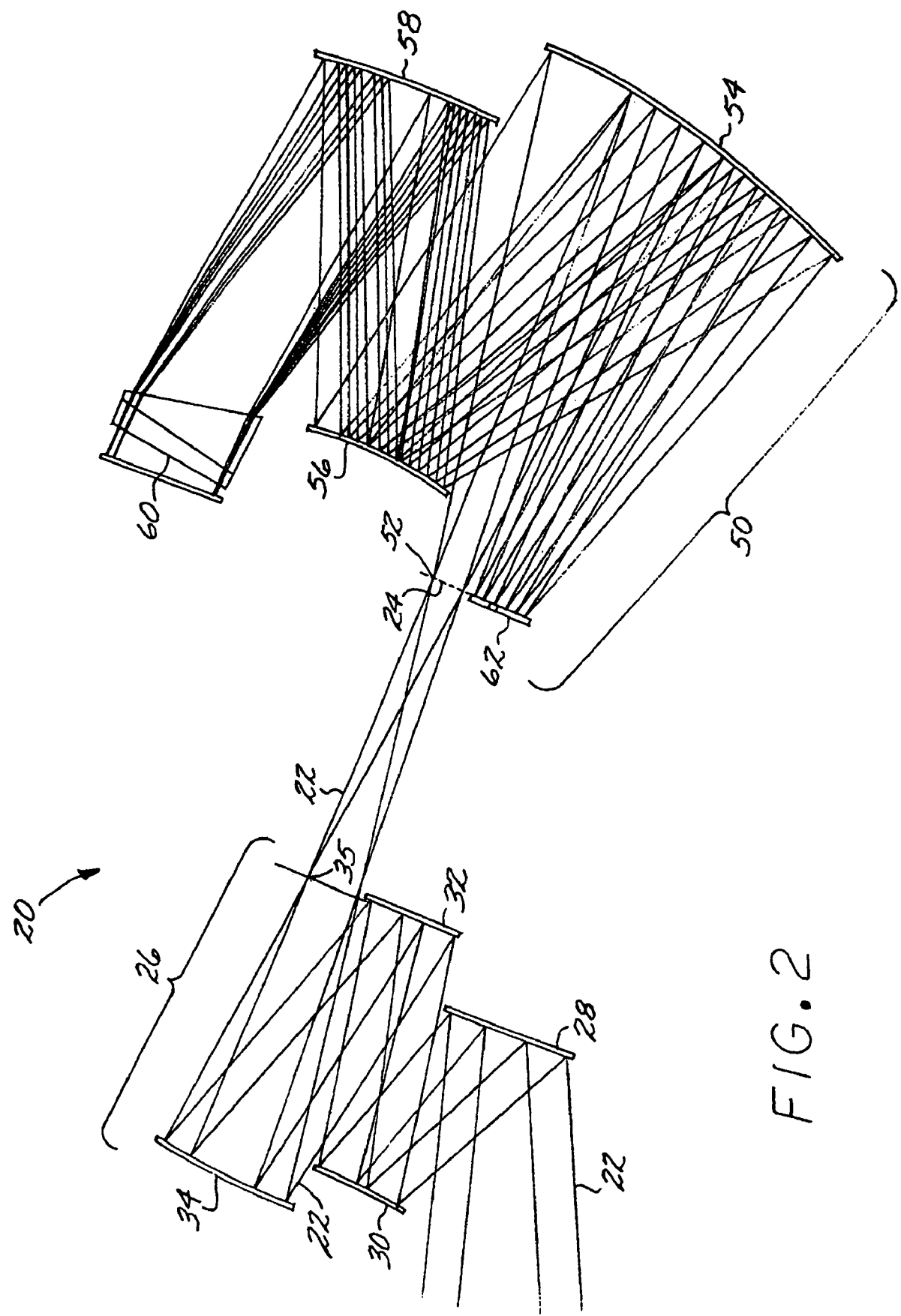
FIG. 2 is a schematic ray path drawing of an optical system using a four-mirror set, in conjunction with a double-pass spectrometer.

FIGS. 1-2 depict two embodiments of an imaging optical system 20, in each case shown in conjunction with an application. (A further optical system with optical components used in conjunction with the other components of the imaging optical system 20 is termed an "application".) The optical system 20 has a beam path 22 defined therethrough and an image plane 24. (That is, the image surface is planar, not curved.) The optical system has a set 26 of mirrors with at least three mirrors on the beam path 22.

The embodiment of FIG. 1 has exactly three optically powered mirrors in the set 26 of mirrors. (An "optically powered mirror" has a positive or negative optical power and does not have a zero optical power. Mirrors with positive or negative optical power are curved, and mirrors with zero optical power are flat.) As found on the beam path 22 of FIG. 1, there is a negative-optical-power primary mirror 28 closest to the scene, a negative-optical-power secondary mirror 30, and a positive-optical-power tertiary mirror 32 closest (as measured along the beam path) to the image plane 24. Only the last mirror on the beam path 22 and thence closest to the image plane 24, here the tertiary mirror 32, has a positive optical power and all other mirrors of the set 26 have negative optical power, giving a particularly wide field of view for the imaging optical system 20. The sum of the optical powers of the mirrors 28, 30, and 32, is zero. Light from the scene is incident on the primary mirror 28, reflects from the primary mirror 28 to the secondary mirror 30, reflects from the secondary mirror 30 to the tertiary mirror 32, and reflects from the tertiary mirror 32, through an external posterior aperture stop 35, to the image plane 24.

The embodiment of FIG. 2 has exactly four optically powered mirrors in the set 26 of mirrors. As found on the beam path 22, there is a negative (but near zero) optical-power primary mirror 28 closest to the scene, a negative-optical-power secondary mirror 30, a negative-optical-power tertiary mirror 32, and a positive-optical-power quaternary mirror 34 closest (as measured along the beam path) to the image plane 24. Only the last mirror on the beam path 22 and thence closest to the image plane 24, here the quaternary mirror 34, has a positive optical power and all other mirrors have negative optical power. The sum of the optical powers of the mirrors 28, 30, 32, and 34 is zero. Light from the scene is incident on the primary mirror 28, reflects from the primary mirror 28 to the secondary mirror 30, reflects from the secondary mirror 30 to the tertiary mirror 32, reflects from the tertiary mirror 32 to the quaternary mirror 34, and reflects from the quaternary mirror 34 through the external posterior aperture stop 35 to the image plane 24. The mirrors of the two embodiments of FIGS. 1 and 2 need not be, and typically are not, of the same construction, materials and shape in the two embodiments.

The set 26 of mirrors, and thence the optical system 20, preferably has the external posterior aperture stop 35 on the beam path 22. An "external posterior aperture stop" as used herein is an aperture (or location where an aperture may be located) positioned between the last powered mirror (the tertiary mirror 32 in FIG. 1 and the quaternary mirror 34 in FIG. 2), and the image plane 24. An aperture or stop positioned on the beam path 22 prior to the last mirror, the tertiary mirror 32 of FIG. 1 or the quaternary mirror 34 of FIG. 2), would not be an external posterior aperture stop. The present optical system has no aperture or stop positioned on the beam path 22 prior to the last mirror.

Another important feature of the present approach is that a back focal length of the optical system 20 is equal to or greater than an effective focal length of the optical system 20.

The embodiment of FIG. 1 illustrates the set 26 of mirrors having exactly the three optically powered mirrors 28, 30, and 32. The set 26 of mirrors serves as the foreoptics for an imaging detector 36, such as an infrared focal plane array, located within a dewar 38 and lying on the beam path 22. The beam path 22 passes into the dewar 38 through a window 40. Within the dewar 38, a cold shield 42 surrounds the imaging detector 36. An opening 44 through the cold shield 42 serves as the external posterior aperture stop 35. That is, the external posterior aperture stop 35 lies between the window 40 and the image plane 24. In this application, having the external posterior aperture stop 35 that lies between the tertiary mirror 32 and the image plane 24, and a long back focal length, are of key importance. All of the mirrors of the set 26 may be positioned outside of the dewar 38, and the external posterior aperture stop may be positioned inside the dewar 38 and as part of the cold shield 42 to minimize thermal noise reaching the imaging detector 42. The long back focal length allows the mirrors 28, 30, and 32 to be positioned with a convenient spacing between the mirrors 28, 30, and 32 and the dewar 38 to avoid the need for crowding the mirrors and the dewar 38 together.

FIG. 2 illustrates the set 26 of mirrors having exactly the four optically powered mirrors 28, 30, 32, and 34. The set 26 of mirrors 28, 30, 32, and 34 serves as the foreoptics for a double-pass spectrometer 50. The image plane 24 of the set 26 of mirrors is positioned at a slit 52. In the double-pass spectrometer 50, the slit image is reflected through a set of three mirrors 54, 56, and 58, and diffracted by a dispersive element 60 (here portrayed as a prism). The dispersed beam is reflected back through the set of three mirrors 58, 56, and 54, and is incident upon one or more detectors 62 located at the plane of the slit 52. The use of the set 26 of mirrors of the present approach is particulary beneficial in this application because it provides an especially wide field of view.

The embodiment of FIG. 1 is illustrated with the three-mirror configuration of foreoptics, and the embodiment of FIG. 2 is illustrated with the four-mirror configuration of foreoptics. However, the three-mirror configuration of foreoptics may be used with the application of FIG. 2, and the four-mirror configuration of foreoptics may be used with the application of FIG. 1. The three-mirror and four-mirror configurations may be used with other applications as well.

Detailed designs of three-mirror and four-mirror sets of mirrors have been prepared.

Figure 3:
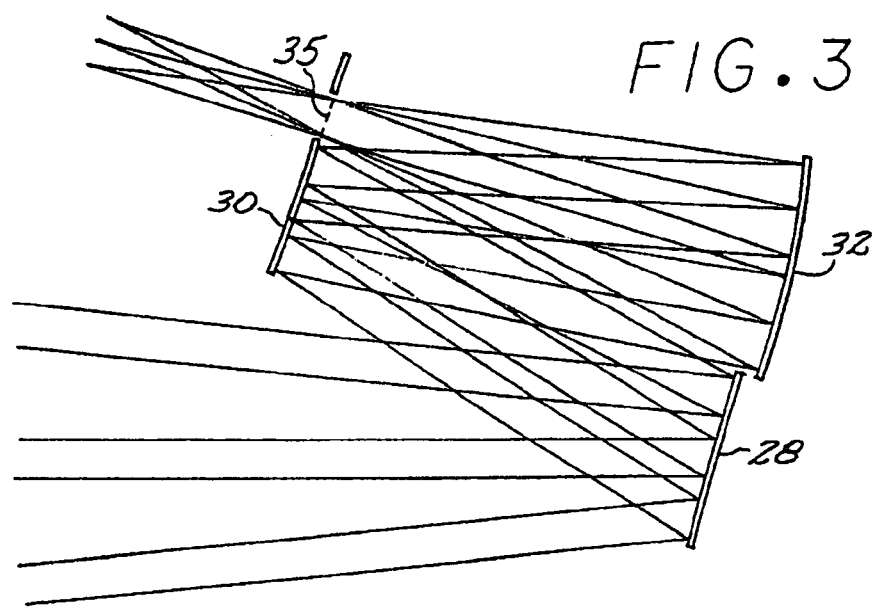
FIG. 3 is an elevational view of a three-mirror imaging optical system.
Figure 4:
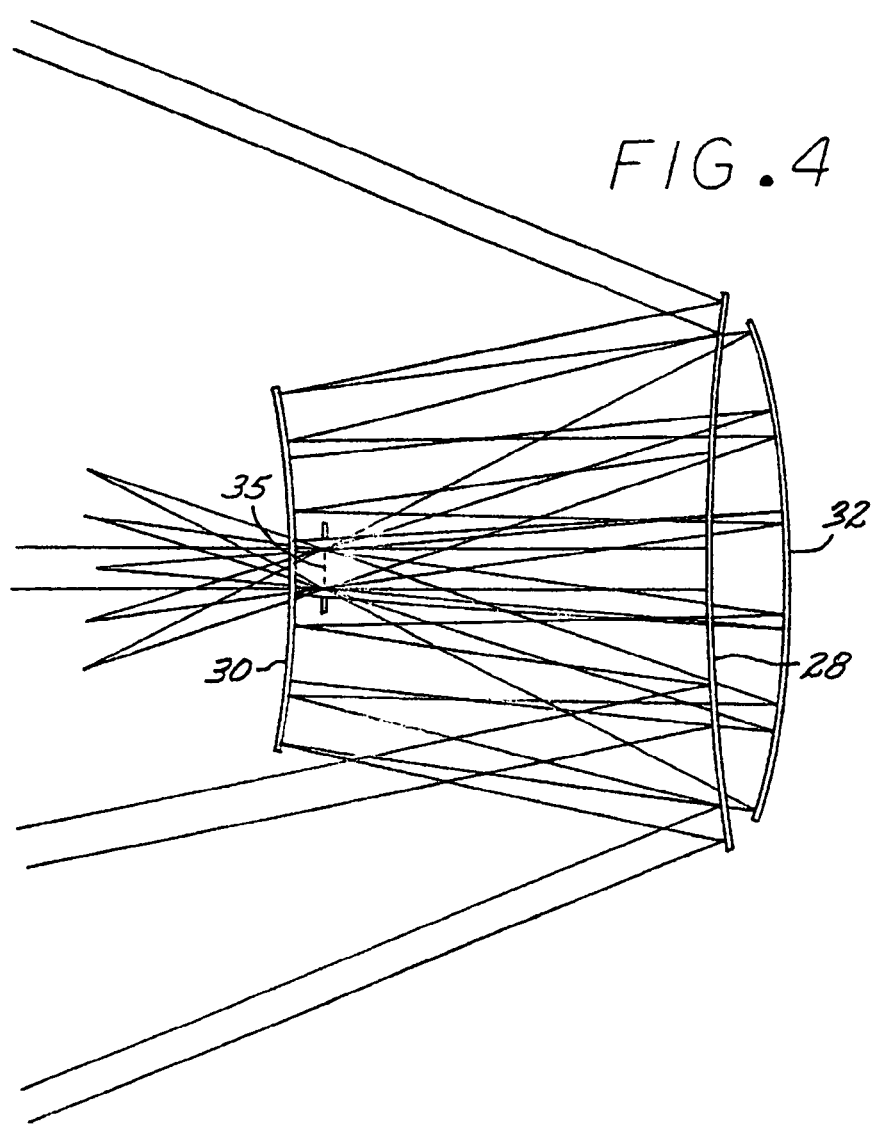
FIG. 4 is a plan view of the three-mirror imaging optical system of FIG. 3.

FIGS. 3-4 show the three-mirror set 26 of mirrors (illustrated generally in FIG. 1) in isolation, and FIG. 5 presents an example of an operable optical prescription for the three-mirror set.

Figure 6:
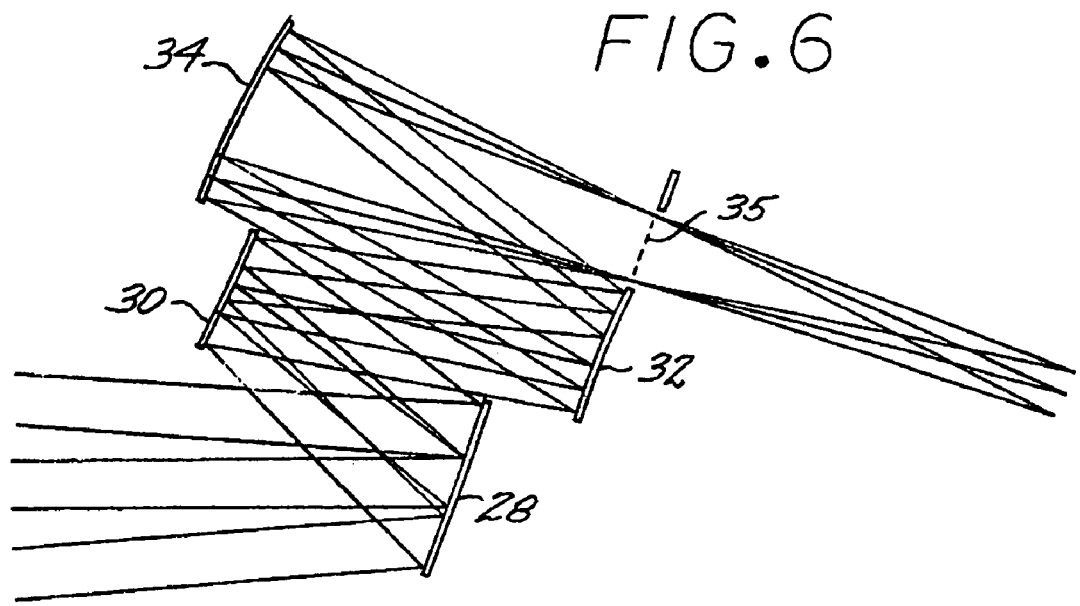
FIG. 6 is an elevational view of a four-mirror imaging optical system.
Figure 7:
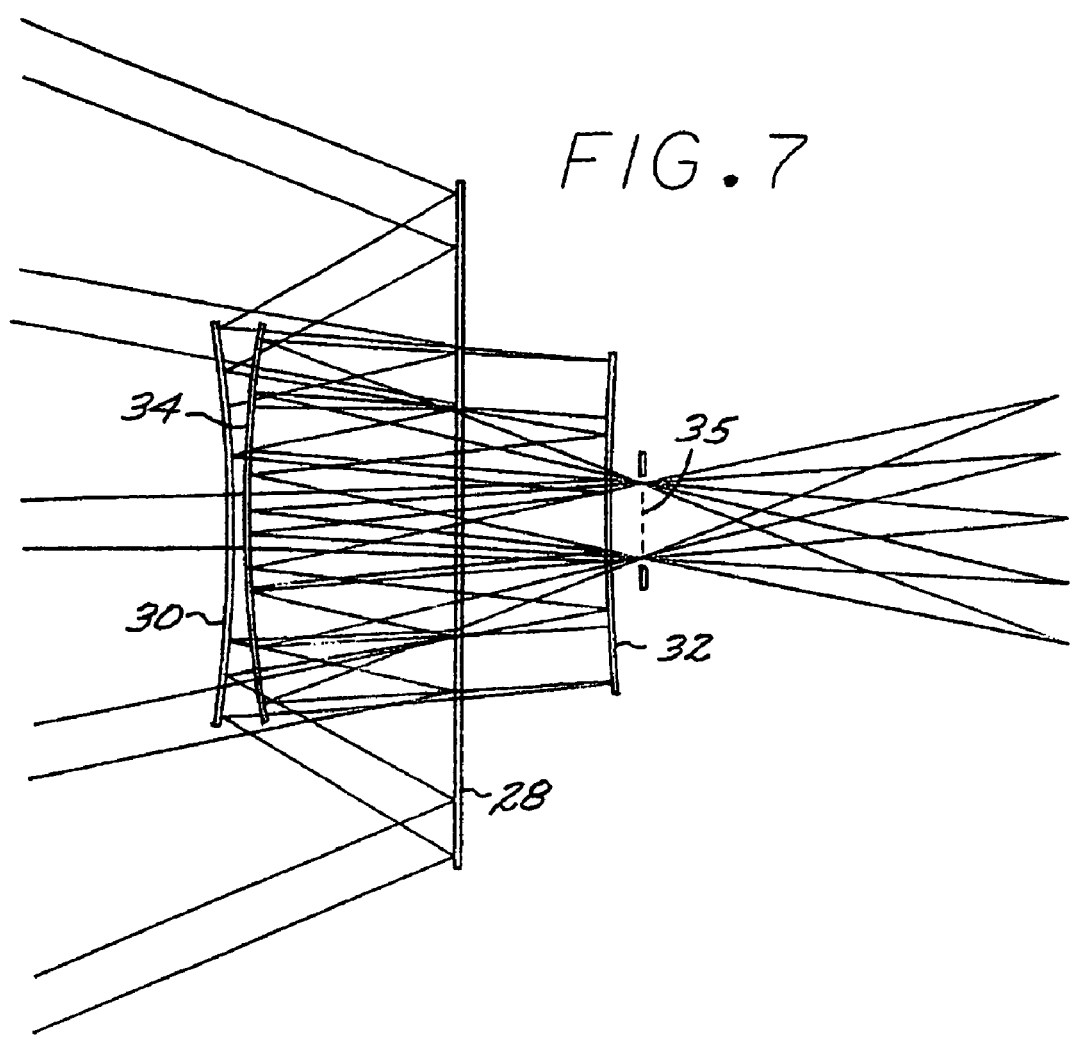
FIG. 7 is a plan view of the four-mirror imaging optical system of FIG. 6.

FIGS. 6-7 show the four-mirror set 26 of mirrors (illustrated generally in FIG. 2) in isolation, and FIG. 8 presents an example of an operable optical prescription for the four-mirror set.

Although a particular embodiment of the invention has been described in detail for purposes of illustration, various modifications and enhancements may be made without departing from the spirit and scope of the invention. Accordingly, the invention is not to be limited except as by the appended claims

What is claimed is:

1. An imaging optical system having a beam path and an image plane, wherein the optical system comprises:
   a set of mirrors comprising at least three mirrors on the beam path,
   wherein only a last mirror on the beam path has a positive optical power and all other mirrors have negative optical power, and
   wherein the sum of the optical powers of the mirrors is zero; and
   an external posterior aperture stop on the beam path between the last mirror and the image plane.

2. The optical system of claim 1, wherein the set of mirrors comprises exactly four optically powered mirrors.

3. The optical system of claim 1, wherein the set of mirrors comprises exactly four optically powered mirrors, and wherein the set of mirrors have optical powers of negative, negative, negative, and positive along the beam path.

4. The optical system of claim 1, wherein a back focal length of the optical system is equal to or greater than an effective focal length of the optical system.

5. The optical system of claim 1, further including an application, and wherein the set of mirrors comprises a foreoptics for the application.

6. The optical system of claim 1, further including a window between the last mirror on the beam path and the external posterior aperture stop.

7. The optical system of claim 1, further including
   a dewar having a window between the last mirror on the beam path and the external posterior aperture stop, wherein the external posterior aperture stop is within the dewar.

8. The optical system of claim 1, further including
   a dewar having a window between the last mirror on the beam path and the external posterior aperture stop, wherein the external posterior aperture stop is within the dewar, and
   a detector on the beam path within the dewar at the image plane, such that the external posterior aperture stop is between the window and the detector.

9. The optical system of claim 1, further including
   a double-pass spectrometer, wherein the set of mirrors comprises a foreoptics for the double-pass spectrometer.

10. The optical system of claim 1, wherein the optical system has a full-angle field of view in at least one direction of greater than about 30 degrees.

11. An imaging optical system having a beam path and an image plane, wherein the optical system comprises:
    a set of mirrors comprising at least three mirrors on the beam path,
    wherein only a last mirror on the beam path has a positive optical power and all other mirrors have negative optical power, and
    wherein the sum of the optical powers of the mirrors is zero; and
    an external posterior aperture stop on the beam path between the last mirror and the image plane,
    wherein the set of mirrors comprises exactly three optically powered mirrors.

12. An imaging optical system having a beam path and an image plane, wherein the optical system comprises:
    a set of mirrors comprising at least three mirrors on the beam path,
    wherein only a last mirror on the beam path has a positive optical power and all other mirrors have negative optical power, and
    wherein the sum of the optical powers of the mirrors is zero; and
    an external posterior aperture stop on the beam path between the last mirror and the image plane,
    wherein the set of mirrors comprises exactly three optically powered mirrors, and wherein the set of mirrors have optical powers of negative, negative, and positive along the beam path.

13. An imaging optical system having a beam path and an image plane, wherein the optical system comprises:
    a set of mirrors comprising exactly three optically powered mirrors or exactly four optically powered mirrors on the beam path,
    wherein only a last mirror on the beam path has a positive optical power and all other mirrors have negative optical power, and wherein the sum of the optical powers of the mirrors is zero; and
    an external posterior aperture stop between the last mirror and the image plane,
    wherein a back focal length of the optical system is equal to or greater than an effective focal length of the optical system.

14. The optical system of claim 13, wherein the set of mirrors comprises exactly four optically powered mirrors.

15. The optical system of claim 13, wherein the set of mirrors comprises exactly four optically powered mirrors, and wherein the set of mirrors have optical powers of negative, negative, negative, and positive along the beam path.

16. The optical system of claim 13, further including
    a dewar having a window between the last mirror on the beam path and the external posterior aperture stop, wherein the external posterior aperture stop is within the dewar, and
    a detector on the beam path within the dewar at the image plane, such that the external posterior aperture stop is between the window and the detector.

17. The optical system of claim 13, further including
    a double-pass spectrometer, wherein the set of mirrors comprises a foreoptics for the double-pass spectrometer.

18. The optical system of claim 13, wherein the optical system has a full-angle field of view in at least one direction of greater than about 30 degrees.

19. An imaging optical system having a beam path and an image plane, wherein the optical system comprises:
    a set of mirrors comprising exactly three optically powered mirrors or exactly four optically powered mirrors on the beam path, wherein only a last mirror on the beam path has a positive optical power and all other mirrors have negative optical power, and wherein the sum of the optical powers of the mirrors is zero; and an external posterior aperture stop between the last mirror and the image plane, wherein a back focal length of the optical system is equal to or greater than an effective focal length of the optical system, wherein the set of mirrors comprises exactly three optically powered mirrors.

20. An imaging optical system having a beam path and an image plane, wherein the optical system comprises:

a set of mirrors comprising exactly three optically powered mirrors or exactly four optically powered mirrors on the beam path, wherein only a last mirror on the beam path has a positive optical power and all other mirrors have negative optical power, and wherein the sum of the optical powers of the mirrors is zero; and an external posterior aperture stop between the last mirror and the image plane, wherein a back focal length of the optical system is equal to or greater than an effective focal length of the optical system, wherein the set of mirrors comprises exactly three optically powered mirrors, and wherein the set of mirrors have optical powers of negative, negative, and positive along the beam path.

* * * * *